United States Patent [19]

Koga et al.

[11] Patent Number: 4,979,306

[45] Date of Patent: Dec. 25, 1990

[54] POWER WORKING MACHINE

[75] Inventors: Hiroaki Koga, Sayama; Akira Nagashima, Kawasaki, both of Japan

[73] Assignee: Kioritz Corporation, Tokyo, Japan

[21] Appl. No.: 461,219

[22] Filed: Jan. 5, 1990

[30] Foreign Application Priority Data

| | | | |
|---|---|---|---|
| Jan. 17, 1989 | [JP] | Japan | 1-3697[U] |
| Jan. 20, 1989 | [JP] | Japan | 1-5144[U] |
| Jan. 25, 1989 | [JP] | Japan | 1-7116[U] |

[51] Int. Cl.[5] .................. A23D 59/00; A23D 57/02

[52] U.S. Cl. .................. 30/381; 30/383

[58] Field of Search .................. 30/144, 166, 381, 383, 30/514, 23.3, 520; 83/788; 19/55; 154/8, 18, 35, 39; 292/254, 300, DIG. 38

[56] References Cited

U.S. PATENT DOCUMENTS

| | | | |
|---|---|---|---|
| 3,036,566 | 5/1962 | Dobbertin . | |
| 3,157,211 | 11/1964 | Wiig . | |
| 3,994,067 | 11/1976 | Hazzard et al. | 30/381 |
| 4,198,752 | 4/1980 | Bross | 30/381 |
| 4,630,372 | 12/1986 | Nagashima | 30/381 |
| 4,665,596 | 5/1987 | Green | 292/DIG. 38 |
| 4,670,985 | 6/1987 | Biersteker | 30/381 |
| 4,727,651 | 3/1988 | Nakajima . | |
| 4,785,540 | 11/1988 | Aruidsson | 30/381 |
| 4,856,195 | 8/1989 | Grossman et al. | 30/383 |

*Primary Examiner*—Douglas D. Watts
*Assistant Examiner*—Paul M. Heyrana, Sr.
*Attorney, Agent, or Firm*—Browdy and Neimark

[57] ABSTRACT

A power working machine having a main body case in which a prime mover is housed, a front handle and a rear handle which handles are gripped by the operator. The front handle has a flat cross-sectional shape reduced in thickness in a direction in which the front handle faces the main body case while being increased in width generally in the longitudinal direction of the machine body.

3 Claims, 5 Drawing Sheets

POWER WORKING MACHINE

BACKGROUND OF THE INVENTION

This invention relates to a power working machine such as a chain saw.

A power working machine, e.g., a chain saw has a main body case cover, a rear handle disposed on a rear portion or upper central portion of the main body case cover, and a front handle extending from its upper front portion to its lower portion on one side along a side surface of the main body case cover. The rear handle is gripped by one hand of the operator to support the main body case, while the front handle is gripped by the other hand of the operator and is used to correctly direct and position the saw chain guide bar of the chain saw to the cutting position on an object such as standing tree or timber as well as to apply a force for cutting the object downward to the saw chain guide bar. The front handle of this type of conventional chain saw is formed of a pipe having a circular sectional shape and therefore tends to slip on the operator's hand when gripped by the operator. It is therefore necessary for the operator to firmly grip the front handle and force the same downward to apply the cutting-down force to the saw chain guide bar. Problems are thereby encountered in that the operator tends to have a pain in his hand and to be soon fatigued, and that it is not possible to use a slender pipe to reduce the size and weight of the main body case.

Ordinarily, the prime mover is fixed to the main body case in a predetermined portion therein at the time of assembly by being screwed to the main body case by means of bolts inserted in holes or cutout portions formed in the main body. Thus, in conventional power working machines such as chain saws, holes and cutout portions through which bolts and the like are inserted are formed in the main body case and are exposed to the outside. There is therefore a risk of foreign materials such as dust and rain water entering the main body case, resulting in damage or deterioration in the internal devices and, hence, a reduction in the life of the machine. Also, the exposed holes and cutout portions in the main body case impair the appearance of the machine and reduce the value of the same in the market.

Moreover, in conventional chain saws, a prime mover such as an air-cooled two stroke cycle internal combustion engine is housed in the main body case and is fixed to the same. For mounting the engine, screw holes are formed in the crank case of the engine, screws are inserted into these screw holes by being passed through holes formed in the main body case and are screwed to fix the engine to the main body case. It is therefore necessary to align the screw holes of the crank case and the main body case with accuracy at the time of assembly, which operation is troublesome and increases the assembly time, and a strict tolerance for working the screw holes is also required It is also necessary to adopt a forming method and a high-class plastic material which satisfy conditions for avoiding any deformation of the main body case when the same is formed. The manufacturing cost is thereby increased.

SUMMARY OF THE INVENTION

It is an object of the present invention to provide a power working machine free from the abovedescribed drawbacks of conventional power working machines, having a simpler structure and easy to manufacture.

It is another object of the present invention to make it possible for the operator to feel by the palm of his hand a fore and aft directionality when he grips the front handle, to easily direct and position the chain saw by gripping the handle firmly, and to easily force the front handle downward by maintaining a major part of the palm in contact with the flat upper surface of the front handle 9 when the operator applying the cutting-down force to the saw chain guide bar, while achieving the small size and light weight of the main body case by reducing the thickness of the handle.

It is still another object of the present invention to enable a cutout recess formed in one of a pair of case portions to be closed by an covering piece and to a lower step portion of the covering piece to be retained in the other case portion to improve the assembly of the main body case, thereby preventing any dust and/or rain water from entering the main body case.

It is a further object of the present invention to provide an engine mount structure in which screws are screwed into only nuts to fasten and fix an engine attachment portion and a wall portion of the main body case to each other without using any special screw working, and which enables the prime mover to be fixed in a predetermined position in the main body case even if attachment portions are misaligned.

DESCRIPTION OF THE PREFERRED EMBODIMENT

An embodiment of the present invention will be described below with reference to the accompanying drawings.

Figure 1:
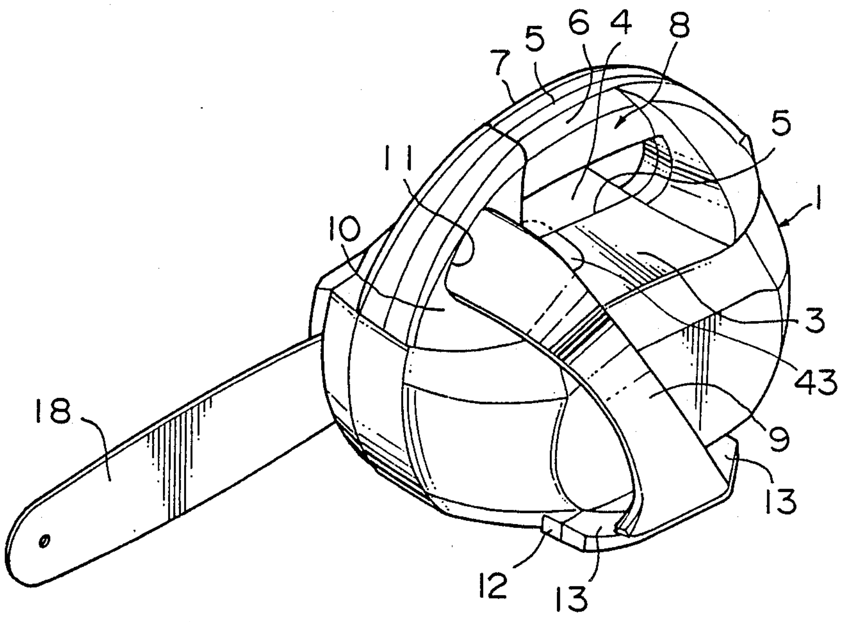
FIGS. 1 and 2 are perspective views of a chain saw in accordance with an embodiment of the present invention seen in different directions.
Figure 2:
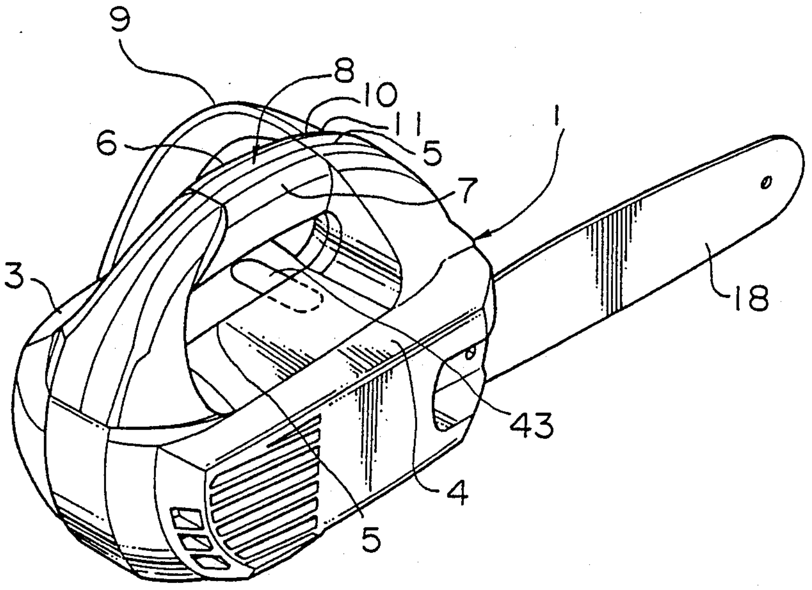
Figure 3:
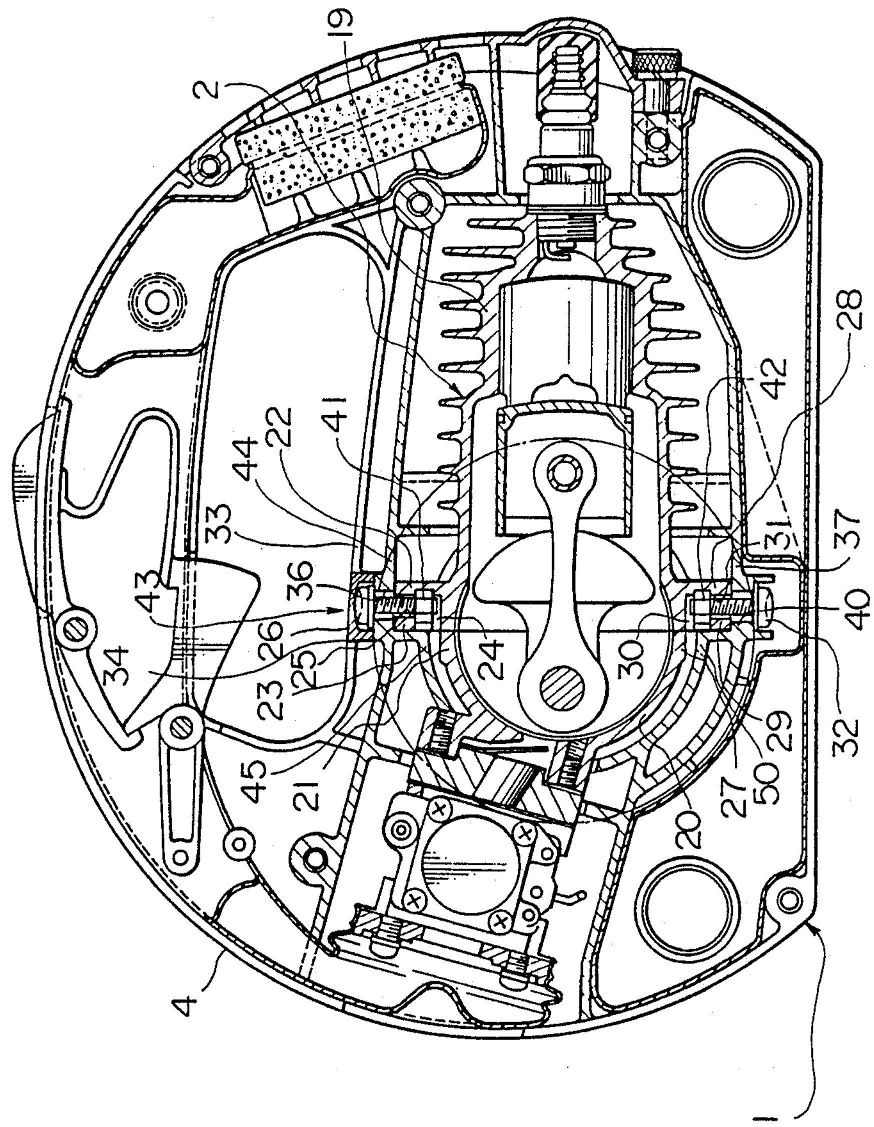
FIG. 3 is a longitudinal cross-sectional view of the chain saw shown in FIGS. 1 and 2.
Figure 4:
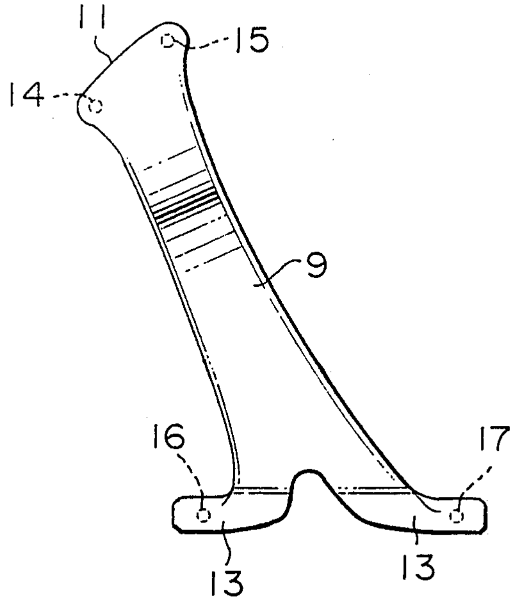
FIG. 4 is a side view of a front handle.

Referring first to FIG. 3, an air-cooled two stroke cycle gasoline engine 2 is housed and fixed as a prime mover in a main body case 1, as described below. The main body case 1 is made by forming a suitable plastic material and has a construction such that two-section left and right case portions 3 and 4 are fitted to each other at joint surfaces 5 to form the main body case 1, as shown in FIGS. 1 and 2. The engine 2 is laterally inserted into one of the case portions, e.g., the right case portion 4 through an opening thereof formed at the joint surface 5 and is fixed therein. The left case portion 3 is then fitted to the right case portion 4 so that the engine 2 is housed inside the case portions 3 and 4. The case portions 3 and 4 are thereafter fixed to each other by means of bolts (not shown) or the like, thereby completing the integral main body case 1 in which the engine 2 is housed.

Rear handle portions 6 and 7 are respectively formed integrally with the case portions 3 and 4 so as to extend generally in the longitudinal direction of the main body case 1. The rear handle portions 6 and 7 are fitted to each other to form a rear handle 8 when the case portions 3 and 4 are connected in the above-described manner.

A front handle 9 is provided on the left case portion 3. The front handle 9 is formed of a synthetic resin, e.g., the same material as the main body case 1 to have a curved shape such that the front handle 9 extends from its upper end portion 11 at which it is attached to a side portion of an upper front portion 10 of the left case portion 3 to its lower end portion 13 at which it is attached to a lower side portion 12 of the left case portion 3, while being spaced apart from the outer surface of the left case portion 3 so that the hand of the operator can be easily put into the space. The front handle 9 is formed so as to be easy to grip; it is reduced in thickness in the direction in which it faces the main body case 1 and has a flat cross-sectional shape elongated generally in the longitudinal direction of the main body case 1. Screw holes 14 and 15 are formed in an end surface of the upper end portion 11 of the front handle 9. Similarly, screw holes 16 and 17 are formed in an end surface of the lower end portion 13. Screws (not shown) are inserted into the screw holes 13 to 17 from the interior of the left case portion 3 by being passed through the same, and are screwed into these holes, thereby fixing the front handle 9 to the left case cover 3. Since the front handle is formed of a thin member, it can be easily bent within the elastic limit of the material, and any difficulty in assembly can be avoided even if there is a certain manufacture error. A saw chain guide bar 18 projects forward from a front portion of the main body case 1. The saw chain guide bar 18 is designed to guide and support an endless saw chain (not shown) around its periphery while the saw chain is being driven by driving force of the engine housed inside the main body case 1, thereby enabling the saw chain to cut an object such as standing tree or timber.

Because of the above-mentioned flat sectional shape of the front handle 9 elongated generally in the longitudinal direction of the main body case 1, the operator feels by the palm of his hand a fore and aft directionality when he grips the front handle 9, it is therefore possible for the operator to easily direct and position the saw chain guide bar correctly relative to the object to be cut. Also, a major part of the palm contacts the flat upper surface of the front handle 9 when the operator applies a cutting-down force to the saw teeth, it is therefore easy for the operator to apply a downward force to the handle. At the same time, the degree of pain in the hand and the degree of fatigue can be reduced, thereby improving the working efficiency.

The engine 2 is disposed so that a cylinder 19 and a crank case 20 faces in the horizontal direction in the main body case 1. The crank case 20 has an upper attachment portion 22 which is integrally formed with the crank case 20 so as to extend upward like a flange. The upper attachment portion 22 has an L-shaped sectional shape and has an extreme end portion 23 which extends laterally and generally parallel to an upper external surface 21 of the crank case 20 so that a generally U-shaped space 24 open on one side is formed between the upper attachment portion 22 and the upper external surface 21. A through hole 25 is formed through the end portion 23 between the upper side of the same and the space 24. The diameter of the through hole 25 is slightly larger than the diameter of the threaded portion of an upper fixing screw 26 mentioned later so that the threaded portion of the screw 26 can be loosely fitted in the through hole 25.

Similarly, a lower attachment portion 28 having an L-shaped sectional shape and extending downward like a flange is formed integrally on a lower external surface 27 of the crank case 20. The lower attachment portion 28 has an L-shaped sectional shape and has an extreme end portion 29 which extends laterally and generally parallel to a lower external surface 27 of the crank case 20 so that a generally U-shaped space 30 open on one side is formed between the upper attachment portion 28 and the lower external surface 27. A through hole 31 is formed through the end portion 29 between the lower side of the same and the space 30. The diameter of the through hole 31 is slightly larger than the diameter of the threaded portion of a lower fixing screw 32 mentioned later so that the threaded portion of the screw 32 can be loosely fitted in the through hole 31.

The right case portion 4 of the main body case 1 has a cutout recess 34 in the form of a half ellipse fromed in its upper side wall 33 so as to extend from the joint surface 5 in a direction generally perpendicular to this surface. The cutout recess 34 is open to the outside above the case portion 4, has a depth larger than the height of the head of the upper fixing screw 26, and has a width larger than the diameter of the head of the screw 26. A vertical hole 36 having a diameter slightly larger than the diameter of the threaded portion of the screw 26 is formed in a recess bottom portion, i.e., an upper wall portion 44. Similarly, a vertical hole 40 is formed in a lower wall portion 37 of the right case portion 4 to receive the lower fixing screw 32.

When the engine 2 is inserted in the right case portion 4 of the main body case 1 as shown in FIG. 3, the end portion 23 of the upper attachment portion 22 of the crank case 20 abuts against the lower surface of the upper wall portion 44 of the right case portion 4. Simultaneously, the end portion 29 of the lower attachment portion 28 of the crank case 20 abuts against the upper surface of the lower wall portion 37 of the right case portion 4. The through hole 36 formed in the upper wall portion 44 is aligned with the through holes 25 formed in the end portion 23 of the upper attachment portion 22 of the crank case 20. Similarly, the through hole 40 formed in the lower wall portion 37 is aligned with the through hole 31 formed in the end portion 29 of the lower attachment portion 28 of the crank case 20. The screw 26 to be loosely fitted in the through holes 25 and 36 is inserted from above the upper wall portion 44 so that the extreme end of the screw 26 projects into the sapce 24. The screw 26 is screwed tight into a nut 41 previously inserted in the space 24 from the one open end thereof, thereby fixing the end portion 23 of the upper attachment portion 22 of the crank case 20 to the upper wall portion 44 of the right case portion 4 of the main body case 1. Also, the screw 32 is inserted from below the lower wall portion 37 of the right case portion 4 of the main body case 1 so that the extreme end of the screw 32 projects into the space 30. The screw 32 is screwed tight into a nut 42 previously inserted in the space 30 from the one open end thereof, thereby fixing the end portion 29 of the lower attachment portion 28 of the crank case 20 to the lower wall portion 37. Next, while the space above the upper screw 26 is covered with an covering piece 43 in the form of a plate such as that shown in FIG. 5, the left case portion 3 is placed on the right case portion 4 so that the joint surfaces 5 contact with each other. The two case portions 3 and 4 are closed by being fastened to each other with a suitable number of screws (not shown), thereby fixing the engine 2 in the main body case 1 with the desired reliability. A portion of the covering piece 43 located on the side of the left case portion 3, i.e., on the left-hand side of the joint surface 5 is retained in the left case portion 3, while the other portion located on the side of the right case portion 4, i.e., on the right-hand side of the joint surface 5 is formed so as to be increased in thickness to have a surface flush with the outside surface of the right case portion 4.

In the above-described arrangement, the diameters of the through holes 25, 31, 36 and 40 are slightly larger than the diameters of the mating screws 26 and 32 so that these screws can be loosely fitted in the corresponding holes, and that the screws can be easily inserted even if the degree of alignment of the through holes is reduced by the working tolerance and/or deformations caused during forming, thereby facilitating the assembly. An attachment portion other than the upper attachment portion 22 and the lower attachment portion 28 may be provided to enable the engine 2 mounted to the main body case 1 more firmly.

The sizes of the spaces 24 and 30 are such that the nuts 41 and 42 is just fitted in the spaces. Stop wall portions 45 and may be provided in the right case portion 4 to close the opening ends of the spaces 24 and 30 to prevent the nuts 41 and 42 from coming off, thereby further facilitating the assembly.

Figure 5:
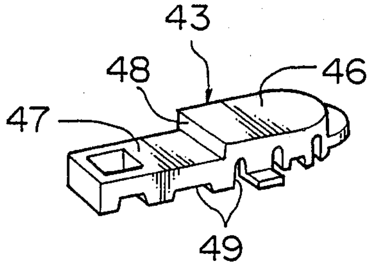
FIG. 5 is a perspective view of an covering piece.

Next, the covering piece 43 shown in FIG. 5 is disposed in the cutout recess 34. The covering piece 43 has a higher step portion 46 corresponding to one of the halves of the covering piece 43 divided in the longitudinal direction, and a lower step portion 47 corresponding to the other half and having a level lower than that of the high step portion 46, and a step-rise surface 48 laterally extending between the portions 46 and 47. The higher step portion 46 has a contour such that it can be fitted in the cutout recess 34 of the upper side wall 33 of the right case portion 4 to tightly close the same. The higher step portion 46 is positioned so that its outside surface is flush with the outside surface of the upper side wall 33 of the right case portion 4 while the step-rise surface 48 coincides with the joint surfaces 5 of the left and right case portions 3 and 4. The lower step portion 47 of the covering piece 43 projects from the joint surface 5 to the side of the left case portion 3. In this state, the lower step portion 47 is inserted into the left case portion 3 while the joint surfaces 5 of the two case portions 3 and 4 are positioned so as to face each other. The lower step portion 47 of the covering piece 43 is then retained inside an upper portion of the left case portion 3 and is thereby inhibited from moving relative to the left case portion 3. The two case portions 3 and 4 are thereafter closed tightly and fixed to each other, thereby firmly fixing the engine 2 in the main body case 1.

Cutout portions 49 may be formed in the lower surface of the covering piece 43 as desired so that the covering piece 43 has a suitable degree of flexibility, thereby facilitating the attachment or detachment of the covering piece 43 while enabling the same to serve as a cord clamp.

In the above-described construction, the covering piece 43 serves to extend the life of the machine by preventing foreing materials such as dust and rain water from entering the main body case 1 through the cutout recess 34 and to improve the appearance of the working machine and, hence, the value of the same in the market by the effect of eliminating the need for holes or cutout recesses which may be exposed in the outside surface of the main body 1 and in which bolts or the like are inserted.

What is claimed is:

1. A power working machine comprising a main body case in which a prime mover is housed, a front handle and a rear handle, said handles being gripped by the operator, wherein said main body case has a two-section case portions brought into abutment against each other at joint surfaces, a cutout recess is formed in a portion of one of said case portions adjacent to the corresponding one of said joint surfaces, and a covering piece is fitted in said cutout recess to close the same, a lower step portion of said covering piece being disposed inside the other one of said case portions to be retained therein.

2. A power working machine according to claim 1 wherein said front handle has a flat cross sectional shape reduced in thickness in a direction in which said front handle faces said main body case, said cross-sectional shape being increased in width generally in the longitudinal direction of the machine body.

3. A power working machine according to claim 1 wherein at least one attachment portion is formed on an outside surface of said prime mover so as to extend therefrom like a flange and to have an end portion disposed close to a wall portion of said main body case, through holes are respectively formed in said end portion of said attachment portion and said wall portion of said main body case, and a screw is inserted in said through holes and is screwed at its extreme end into a nut to fasten the end portion of said attachment portion and said wall portion and to thereby fix said prime mover to said main body case.

* * * * *